US012691674B2

(12) United States Patent
Kanazawa et al.

(10) Patent No.: US 12,691,674 B2
(45) Date of Patent: Jul. 28, 2026

(54) METAL WIRE AND METAL MESH

(71) Applicant: Panasonic Intellectual Property Management Co., Ltd., Osaka (JP)

(72) Inventors: Tomohiro Kanazawa, Osaka (JP); Kazuhiro Daijo, Osaka (JP); Kenshi Tsuji, Osaka (JP); Naoki Kohyama, Osaka (JP); Yui Nakai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 18/279,061

(22) PCT Filed: Dec. 21, 2021

(86) PCT No.: PCT/JP2021/047254
§ 371 (c)(1),
(2) Date: Aug. 27, 2023

(87) PCT Pub. No.: WO2022/190557
PCT Pub. Date: Sep. 15, 2022

(65) Prior Publication Data

US 2024/0131836 A1 Apr. 25, 2024
US 2024/0227384 A9 Jul. 11, 2024

(30) Foreign Application Priority Data

Mar. 12, 2021 (JP) ................................ 2021-040071

(51) Int. Cl.
*D03D 15/33* (2021.01)
*B41F 15/34* (2006.01)
(Continued)

(52) U.S. Cl.
CPC ................ *B41F 15/34* (2013.01); *B41N 1/04* (2013.01); *B41N 1/247* (2013.01); *C22C 27/04* (2013.01);
(Continued)

(58) Field of Classification Search
CPC ........... B41F 15/34; B41N 1/04; B41N 1/247; D03D 15/33; D03D 15/67; D03D 1/00;
(Continued)

(56) References Cited

U.S. PATENT DOCUMENTS

2022/0098708 A1 3/2022 Kanazawa et al.
2022/0220591 A1 7/2022 Kanazawa et al.
(Continued)

FOREIGN PATENT DOCUMENTS

CN 107757069 A * 3/2018
JP 3381955 B 3/2003
(Continued)

OTHER PUBLICATIONS

Jeremy E. Schaffer, Lisa Powell, Adam Griebel, Robert A. Mitchell, David Braaten, Andrew Kritsch, Superlative Strength Wire and Cable for Force Transmission, Aug. 7, 2020.*
(Continued)

*Primary Examiner* — Christopher E Mahoney
*Assistant Examiner* — Marissa Ferguson-Samreth
(74) *Attorney, Agent, or Firm* — Renner, Otto, Boisselle & Sklar, LLP

(57) ABSTRACT

A metal wire includes tungsten or a tungsten alloy. The metal wire has a diameter of at most 13 μm, a tensile strength of at least 4.8 GPa, and a natural hanging length per 1000 mm of at least 800 mm.

11 Claims, 5 Drawing Sheets

(51) Int. Cl.

| | |
|---|---|
| ***B41N 1/04*** | (2006.01) |
| ***B41N 1/24*** | (2006.01) |
| ***C22C 27/04*** | (2006.01) |
| ***C22F 1/18*** | (2006.01) |
| ***D03D 1/00*** | (2006.01) |
| ***D03D 9/00*** | (2006.01) |
| ***D03D 15/67*** | (2021.01) |

(52) U.S. Cl.
CPC ................. *C22F 1/18* (2013.01); *D03D 1/00* (2013.01); *D03D 9/00* (2013.01); *D03D 15/33* (2021.01); *D03D 15/67* (2021.01); *D10B 2505/00* (2013.01)

(58) Field of Classification Search
CPC .. D03D 9/00; C22C 27/04; C22F 1/18; D10B 2505/00
See application file for complete search history.

(56) References Cited

U.S. PATENT DOCUMENTS

| | | | | |
|---|---|---|---|---|
| 2023/0227951 | A1 | 7/2023 | Kanazawa et al. | |
| 2023/0366068 | A1* | 11/2023 | Kanazawa | C22C 27/04 |

FOREIGN PATENT DOCUMENTS

| | | | | | |
|---|---|---|---|---|---|
| JP | 2018122599 | | * | 8/2018 | |
| JP | 2020-105548 | A | | 7/2020 | |
| JP | 2020138547 | A | * | 9/2020 | |
| JP | 2022-001660 | A | | 1/2022 | |
| TW | 202106894 | A | | 2/2021 | |
| WO | WO-2018146619 | A2 | * | 8/2018 | B41M 1/22 |
| WO | WO-2020137255 | A1 | * | 7/2020 | B21C 1/003 |
| WO | WO-2021033500 | A1 | * | 2/2021 | |

OTHER PUBLICATIONS

International Search Report for corresponding Application No. PCT/JP2021/047254, mailed Mar. 15, 2022.
Written Opinion for corresponding Application No. PCT/JP2021/047254, mailed Mar. 15, 2022.
Chinese Office Action for corresponding Chinese Patent Application No. 202180094247.2, issued Mar. 27, 2025.
Chinese Search Report accompanying the Office Action for corresponding Chinese Patent Application 202180094247.2, issued Mar. 27, 2025, with English translation.

* cited by examiner

METAL WIRE AND METAL MESH

TECHNICAL FIELD

The present invention relates to a metal wire and a metal mesh.

BACKGROUND ART

Conventionally, a tungsten wire having a small diameter and high tensile strength has been known (for example, see Patent Literature (PTL) 1).

CITATION LIST

Patent Literature

[PTL 1] Japanese Unexamined Patent Application Publication No. 2020-105548

SUMMARY OF INVENTION

Technical Problem

However, with the conventional tungsten wire mentioned above, there is a problem that straightness decreases when the diameter is reduced while high tensile strength is maintained.

Therefore, an object of the present invention is to provide a metal wire having a small diameter and an excellent tensile strength and straightness, and a metal mesh including the metal wire.

Solution to Problem

A metal wire according to one aspect of the present invention includes tungsten or a tungsten alloy. The metal wire has a diameter of at most 13 μm, a tensile strength of at least 4.8 GPa, and a natural hanging length per 1000 mm of at least 800 mm.

A metal mesh according to one aspect of the present invention includes the metal wire according to the one aspect as warp or weft.

Advantageous Effects of Invention

The present invention can provide a metal wire having a small diameter and having excellent tensile strength and straightness.

DESCRIPTION OF EMBODIMENTS

The following describes in detail a metal wire and a metal mesh according to an embodiment of the present invention with reference to the drawings. Note that each of the embodiments described below shows a specific example of the present invention. Therefore, the numerical values, shapes, materials, structural components, the arrangement and connection of the structural components, steps, the processing order of the steps, and so on, shown in the following embodiments are mere examples, and therefore do not limit the present invention. Among the structural components in the embodiments described below, those not recited in the independent claims will be described as optional structural components.

In addition, figures are schematic illustrations and are not necessarily precise depictions. Accordingly, for example, the figures are not necessarily to scale. Moreover, in the figures, structural components that are essentially the same share like reference signs. Accordingly, duplicate description is omitted or simplified.

Moreover, in the present specification, terms representing shapes of structural components, such as circular, and numerical ranges include, not only the precise meanings, but also substantially equal ranges including, for example, a difference of about several percent.

EMBODIMENT

[Configuration]

First, a metal wire according to an embodiment and a metal mesh including the metal wire will be described with reference to FIG. 1.

Figure 1:
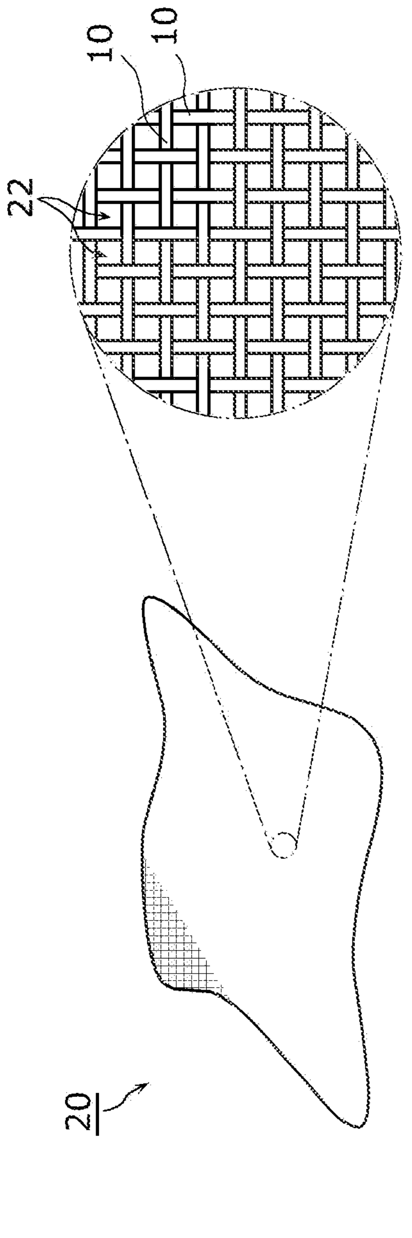
FIG. 1 is a schematic diagram of a metal mesh including a metal wire according to an embodiment.

FIG. 1 is a schematic diagram of metal mesh 20 including metal wire 10 according to the present embodiment. FIG. 1 schematically illustrates a mesh of only a portion of metal mesh 20, but the entire metal mesh 20 is mesh-patterned. Metal mesh 20 includes a plurality of metal wires 10 as warp and weft. In other words, metal mesh 20 is manufactured by weaving each of the plurality of metal wires 10 as warp or weft.

Metal mesh 20 is, for example, a screen mesh used for screen printing. Metal mesh 20 includes a plurality of openings 22. Each opening 22 is a part through which ink passes in screen printing. By sealing a portion of openings 22 with an emulsion or resin (for example, polyimide), a non-passing part, which is a part where ink cannot pass through, is formed. By patterning the shape of the non-passing part into an arbitrary shape, screen printing can be performed with a desired shape.

When metal mesh 20 is used for screen printing, the diameter of metal wire 10 is gradually reduced so as to improve the accuracy of screen printing. As the diameter decreases, the absolute strength decreases significantly as the sectional area of metal wire 10 decreases. For example, a typical tungsten wire having a diameter of 13 μm has a tensile strength of 3.4 GPa and an absolute strength of 0.45 N. In contrast, regarding a tungsten wire having a reduced diameter of 11 μm, the absolute strength is reduced to 0.32 N. To compensate for the decrease in the absolute strength, increase in strength per sectional area, that is, increase in tensile strength, is required. For example, a tensile strength of at least 4.8 GPa is required for metal wire 10 having a diameter of 11 μm.

Metal wire 10 is a tungsten wire including tungsten (W) or a tungsten alloy wire including a tungsten alloy. The tungsten content is, for example, at least 75 wt %. The tungsten content may be at least 80 wt %, at least 85 wt %, at least 90 wt %, at least 95 wt %, at least 99 wt %, at least 99.9 wt %, or at least 99.99 wt %.

Note that the tungsten content is a proportion of tungsten with respect to the weight of metal wire 10. The same applies to the content of other elements, such as rhenium (Re) and potassium (K), which will be described later. Moreover, metal wire 10 may include inevitable elements that cannot be avoided in manufacturing.

The tungsten alloy is an alloy of rhenium and tungsten (ReW alloy), for example. The rhenium content is, for example, at least 0.1 wt % and at most 10 wt %. The rhenium content may be at least 0.5 wt % or at least 1 wt %. Furthermore, the ruthenium content may be at least 5 wt/c.

When the rhenium content is high, the tensile strength of metal wire 10 can be increased. On the other hand, when the rhenium content is too high, it is difficult to reduce the diameter while maintaining high tensile strength of metal wire 10. Specifically, wire breakage is more likely to occur, making it difficult to draw a wire such that the wire has a long length. By lowering the rhenium content and increasing the tungsten content to at least 90 wt %, the workability of metal wire 10 can be improved. In addition, by reducing the content of rhenium, which is rare and expensive, it is possible to mass-produce an inexpensive metal wire 10 having a long length.

The diameter of meal wire 10 is at most 13 μm. As the diameter decreases, metal mesh 20 having a higher aperture ratio can be produced. For example, printing precision can be improved. The diameter of metal wire 10 may be at most 12 μm, at most 10 μm, at most 8 μm, or at most 7 μm. The diameter of metal wire 10 is, for example, but not limited to, at least 5 μm.

The diameter variation of meal wire 10 is at most 1.0 μm. The diameter variation corresponds to an absolute difference between a maximum value and a minimum value of the diameter of metal wire 10. Therefore, the difference in diameter between any two points of metal wire 10 is at most 1.0 μm. The diameter variation can be measured based on, for example, a laser diameter measuring machine, a scanning electron microscope (SEM), or a laser microscope. The diameter variation may be at most 0.6 μm, at most 0.5 μm, at most 0.4 μm, or at most 0.3 μm.

It should be noted that the sectional shape of the section of metal wire 10 perpendicular to the axis of metal wire 10 is, for example, circular, but is not limited to this example. The sectional shape of metal wire 10 may be oval, square, or rectangular, for example.

The tensile strength of metal wire 10 is at least 4.8 GPa (=4800 MPa). The tensile strength may be at least 4.9 GPa, at least 5.0 GPa, at least 5.1 GPa, or at least 5.2 GPa. Tensile strength can be measured, for example, in accordance with the tensile test of Japanese Industrial Standard (JIS H 4460 8).

The straightness of metal wire 10 is expressed as a natural hanging length per 1000 mm. Specifically, the natural hanging length (i.e., straightness) per 1000 mm of metal wire 10 is at least 800 mm. The straightness of metal wire 10 may be at least 900 mm, at least 950 mm, or at least 970 mm. The natural hanging length can be measured, for example, in accordance with the straightness test of Japanese Industrial Standard (JIS H 4460 15).

As described above, metal wire 10 according to the present embodiment has a small diameter, high tensile strength, and high straightness. In addition, metal wire 10 according to the present embodiment has a high tungsten content and excellent workability.

[Manufacturing Method]

Figure 2A:
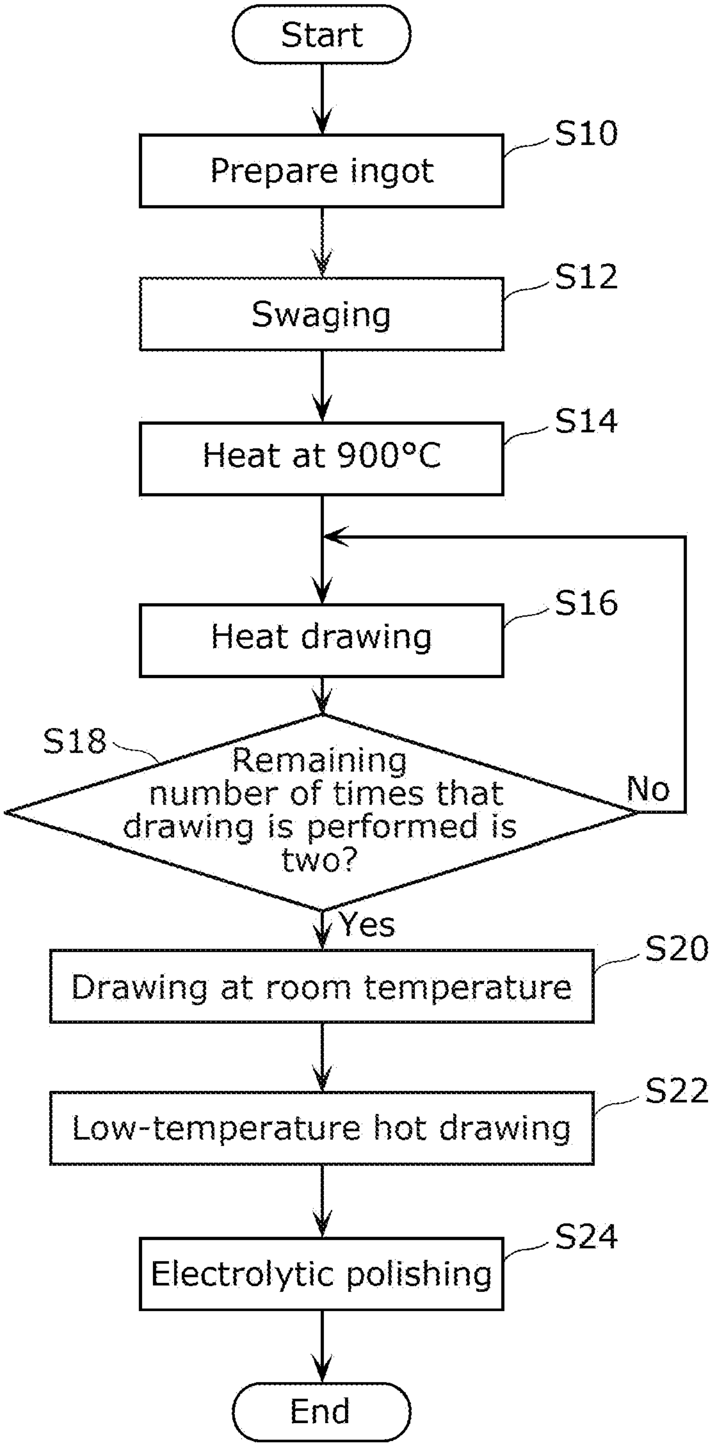
FIG. 2A is a flowchart illustrating a method of manufacturing the metal wire according to the embodiment.
Figure 2B:
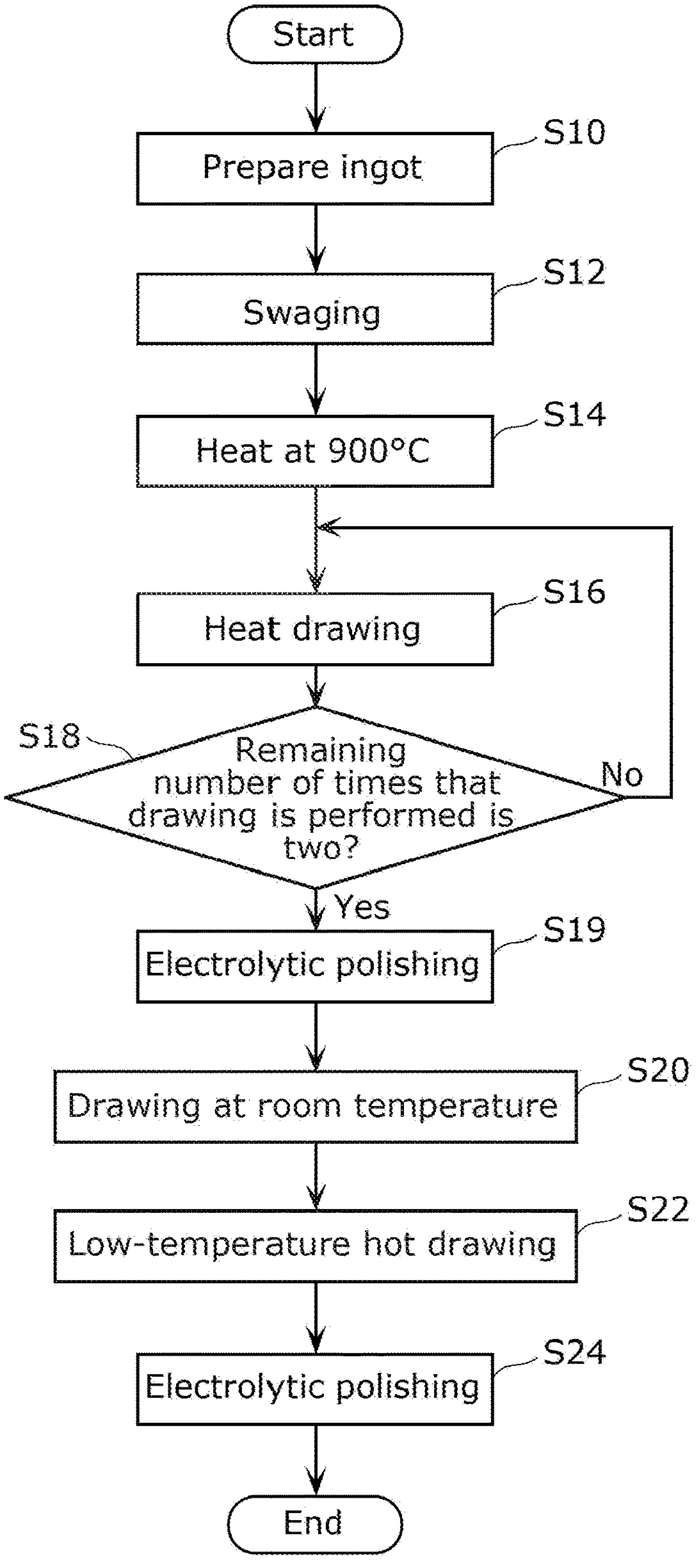
FIG. 2B is a flowchart illustrating another example of the method of manufacturing the metal wire according to the embodiment.

Next, a method of manufacturing metal wire 10 will be described with reference to FIG. 2A and FIG. 2B. FIG. 2A is a flowchart illustrating the method of manufacturing metal wire 10 according to the present embodiment. FIG. 2B is a flowchart illustrating another example of the method of manufacturing metal wire 10 according to the present embodiment.

As illustrated in FIG. 2A, first, a tungsten ingot is prepared (S10). More specifically, a tungsten ingot is produced by preparing an aggregation of tungsten powder and pressing and sintering the prepared aggregation of tungsten powder.

Note that, when metal wire 10 containing a tungsten alloy is manufactured, a mixture of tungsten powder and metal powder (for example, rhenium powder) mixed in a predetermined proportion is prepared instead of the aggregation of tungsten powder. The average particle size of the tungsten powder and the rhenium powder is in a range of, for example, but not limited to, at least 3 μm and at most 4 μm.

Next, swaging processing is performed on the produced tungsten ingot (S12). More specifically, the tungsten ingot is press-forged from its periphery and extended to be a tungsten wire having a wire shape. The ingot may be subjected to rolling processing instead of the swaging processing.

For example, by repeating the swaging processing, the tungsten ingot having a diameter of approximately at least 15 mm and at most 25 mm is formed into a tungsten wire having a diameter of approximately 3 mm. By performing annealing during an intermediate process of the swaging processing, it is possible to ensure workability in the subsequent processing. For example, annealing is performed at 2400° C. in a range that the diameter is at least 8 mm and at most 10 mm. Note that, in order to achieve the tensile strength by crystal grain refinement, annealing is not performed in the swaging processing when the diameter is less than 8 mm.

Next, prior to heat drawing, the tungsten wire is heated at 900° C. (S14). More specifically, the tungsten wire is directly heated by a burner, for example. An oxide layer is formed on the surface of the tungsten wire by heating the tungsten wire, to prevent breakage of the tungsten wire during the processing in the subsequent heat drawing.

Next, heat drawing is performed (S16). More specifically, drawing of the tungsten wire, namely, a wire drawing process (thinning) of the tungsten wire, is performed using one or more wire drawing dies, while the metal wire is being heated. The heating temperature is, for example, 1000° C. Since the workability of the tungsten wire is enhanced as the heating temperature increases, the drawing can be performed easily. Heat drawing is repeatedly performed while changing the one or more wire drawing dies. The reduction in area of the tungsten wire by one wire drawing process using a single wire drawing die is, for example, at least 10% and at most 40%. In the heat drawing, a lubricant including graphite dispersed in water may be used.

The heat drawing (S16) is repeated until a desired tungsten wire is obtained (No in S18). The desired diameter here is a diameter when the remaining number of times that the drawing is performed is two. The desired diameter is, for example, approximately 80 μm.

Note that, in the repeating of the heat drawing, a wire drawing die having a smaller pore diameter than a pore diameter of a wire drawing die used in the heat drawing immediately before is used. In addition, in the repeating of the heat drawing, the tungsten wire is heated at a heating temperature lower than the heating temperature in the heat drawing immediately before. In other words, the heating temperature is gradually lowered. The final heating temperature is, for example, 400° C., which contributes to refinement of crystal grains.

When a tungsten wire having the desired diameter is obtained and the remaining number of times that the drawing is performed is two (Yes in S18), drawing at room temperature is performed (S20). Note that, as illustrated in FIG. 2B, electrolytic polishing may be performed (S19) before the drawing at room temperature (S20). In the drawing at room temperature, the tungsten wire is drawn without heating to achieve further refinement of crystal grains. Moreover, the drawing at room temperature also has an effect of aligning the crystal orientation in the processing axis direction (specifically, a direction parallel to the axis of metal wire 10).

The room temperature is, for example, a temperature in the range of at least 0° C. and at most 50° C. An example of the room temperature is 30° C. Specifically, the tungsten wire is drawn using a plurality of wire drawing dies having different pore diameters. In the drawing at room temperature, a liquid lubricant such as a water-soluble lubricant is used. Since heating is not carried out in the drawing at room temperature, liquid evaporation is inhibited. Accordingly, a sufficient function as a lubricant can be exerted. In contrast to the heat drawing at 600° C. or higher, which is the traditional tungsten wire processing method conventionally performed, the tungsten wire is not heated and is processed while being cooled with the liquid lubricant. As a result, it is possible to inhibit dynamic recovery and dynamic recrystallization, thereby contributing to the refinement of crystal grains without wire breakage and achieving high tensile strength.

The processing rate in the drawing at room temperature is, for example, at least 70%. The processing rate is expressed by the following Expression (1) using diameter Db immediately before the drawing at room temperature and diameter Da immediately after the drawing at room temperature.

$$\text{Processing rate}=\{1-(Da/Db)^2\}\times 100 \quad (1)$$

As can be seen from Expression (1), the value of processing rate increases as the diameter greatly decreases due to the drawing at room temperature. For example, even when diameter Db immediately before the drawing at room temperature is the same, diameter Da immediately after the drawing at room temperature decreases as the processing rate increases. By increasing the processing rate, the degree of thinning the tungsten wire due to the drawing at room temperature increases, that is, a thinner tungsten wire is obtained. The processing rate of the drawing at room temperature is at least 70%, but may be at least 80%, at least 90%, or at least 95%. The diameter immediately after the drawing at room temperature is approximately in a range of at least 20 μm and at most 40 μm.

Next, low-temperature hot drawing is performed (S22) after the drawing at room temperature. In other words, the last drawing of the tungsten wire is performed while the tungsten wire is being heated at a low temperature. The temperature at this time is higher than the temperature (room temperature) for the drawing at room temperature (S20) and lower than the temperature for the heat drawing (S16). Specifically, the temperature for the low-temperature hot drawing is in a range of at least 100° C. and at most 300° C. An example of the temperature for the low-temperature hot drawing is 200° C. or 300° C. The diameter after the low-temperature hot drawing is approximately in a range of at least 10 μm and at most 16 μm.

The low-temperature hot drawing is a new processing method in which the heating temperature for the processing is reduced by approximately 300° C., compared with the heating temperature of 500° C. to 600° C. in normal drawing. This makes it possible to enhance tensile strength and improve straightness or diameter variation. On the other hand, when the processing is performed at 500° C. to 600° C. after the drawing at room temperature, the tensile strength decreases and does not reach 4.8 GPa (Comparative Example 27 in Table 2, which will be described below).

Lastly, electrolytic polishing is performed on the tungsten wire resulting from the low-temperature hot drawing in order to finely adjust the diameter (S24). For example, electrolytic polishing is performed by immersing the tungsten wire and a counter electrode in an electrolyte solution, such as a sodium hydroxide solution, and causing a potential difference between the tungsten wire and the counter electrode. The diameter after the electrolytic polishing is at most 13 μm.

Through the above-described processes, metal wire 10 according to the present embodiment is manufactured. Through the above-described processes, the length of metal wire 10 immediately after being manufactured is, for example, at least 50 km, and thus is industrially available. Metal wire 10 is cut to an appropriate length according to the aspect in which metal wire 10 is to be used, and can also be used in a shape of a needle or a stick, for example.

Note that, each of the processes described in the method of manufacturing metal wire 10 is performed, for example, as an in-line process. More specifically, the plurality of wire drawing dies used in step S16 are arranged in order of decreasing pore diameter along the production line. In addition, heating devices such as burners are arranged between the wire drawing dies. In addition, an electrolytic polishing device may be arranged between the wire drawing dies. In addition, on the downstream side (post-processing side) of the wire drawing dies used in step S16, one or more wire drawing dies used in step S20 and one or more wire drawing dies used in step S22 are arranged in order of decreasing pore diameter, and the electrolytic polishing device is arranged on the downstream side of the wire drawing die having the smallest pore diameter. Note that each of the processes may be performed individually.

In addition, the method of manufacturing metal wire 10 described above is only one example, and the temperature and the diameter in each process can be adjusted appropriately.

As described above, in the method of manufacturing metal wire 10 according to the present embodiment, heat drawing is performed at a first temperature that is a high temperature; drawing at room temperature is performed at a second temperature that is room temperature; and subsequently, low-temperature hot drawing is performed at a third temperature that is a low temperature. The third temperature is higher than the second temperature (room temperature) and lower than the first temperature (high temperature).

As described above, metal wire 10 is manufactured by implementing a new process called low-temperature hot drawing (also called low-temperature hot working). By performing the low-temperature hot drawing, it is possible to achieve metal wire 10 having a small diameter and a diameter deviation of at most 1.0 μm and also having both high tensile strength and high straightness.

Working Example

In the following, working examples of metal wire 10 according to the present embodiment are described with reference to Table 1 and FIGS. 3 and 4, in comparison with metal wires according to comparative examples that are manufactured without the low-temperature hot drawing.

Table 1 below shows a material, processing method (drawing method), diameter, tensile strength, straightness (natural hanging length per 1000 mm), and diameter variation of each of working examples and comparative examples of metal wires including tungsten or a tungsten alloy.

The metal wire in each of Working Examples 1 to 14 is a metal wire manufactured according to the flowchart shown in FIG. 2A. The metal wire in each of Working Examples 1 to 14 is a metal wire obtained by performing both drawing at room temperature (S20) and low-temperature hot drawing (S22) while appropriately adjusting processing conditions such as the material, the target value of the diameter, the

TABLE 1

| | | Processing method | | | | | |
|---|---|---|---|---|---|---|---|
| Working Example No. | Material | Drawing at room temperature (processing rate) | Low-temperature hot drawing (temperature) | Diameter [μm] | Tensile strength [GPa] | Straightness [mm] | Diameter variation [μm] |
| 1 | ReW | Performed: 70% | Performed: 300° C. | 13 | 5.0 | 930 | 0.4 |
| 2 | (Re: | | | 11 | 5.1 | 970 | 0.4 |
| 3 | 1 wt %) | | | 9 | 5.0 | 970 | 0.4 |
| 4 | | Performed: 70% | Performed: 200° C. | 9 | 5.2 | 920 | 0.5 |
| 5 | | Performed: 80% | Performed: 300° C. | 9 | 5.2 | 960 | 0.4 |
| 6 | | | | 7 | 5.2 | 960 | 0.4 |
| 7 | W | Performed: 70% | Performed: 300° C. | 13 | 4.9 | 820 | 0.5 |
| 8 | | | | 11 | 4.9 | 950 | 0.3 |
| 9 | | | | 9 | 4.9 | 950 | 0.4 |
| 10 | | | | 7 | 4.9 | 970 | 0.6 |
| 11 | | Performed: 80% | Performed: 300° C. | 9 | 5.1 | 940 | 0.5 |
| 12 | | | | 7 | 5.1 | 960 | 0.5 |
| 13 | | Performed: 80% | Performed: 200° C. | 9 | 5.2 | 840 | 0.6 |
| 14 | | | | 7 | 5.2 | 910 | 0.7 |

TABLE 2

| | | Processing method | | | | | |
|---|---|---|---|---|---|---|---|
| Comparative Example No. | Material | Drawing at room temperature (processing rate) | Low-temperature hot drawing (temperature) | Diameter [μm] | Tensile strength [GPa] | Straightness [mm] | Diameter variation [μm] |
| 21 | W | Performed: 70% | Not | 13 | 4.9 | 760 | 1.9 |
| 22 | | | performed | 11 | 4.8 | 530 | 1.6 |
| 23 | | Not | Not | 13 | 3.4 | 950 | 0.5 |
| 24 | | performed | performed | 11 | 3.7 | 940 | 0.5 |
| 25 | | | | 13 | 4.4 | 940 | 0.5 |
| 26 | | | | 8 | 4.5 | 900 | 0.4 |
| 27 | | Performed: 70% | Normal hot drawing | 9 | 4.6 | 950 | 0.6 |
| 28 | | | Straight annealing | 13 | 4.5 | 920 | 1.9 |

Figure 3:
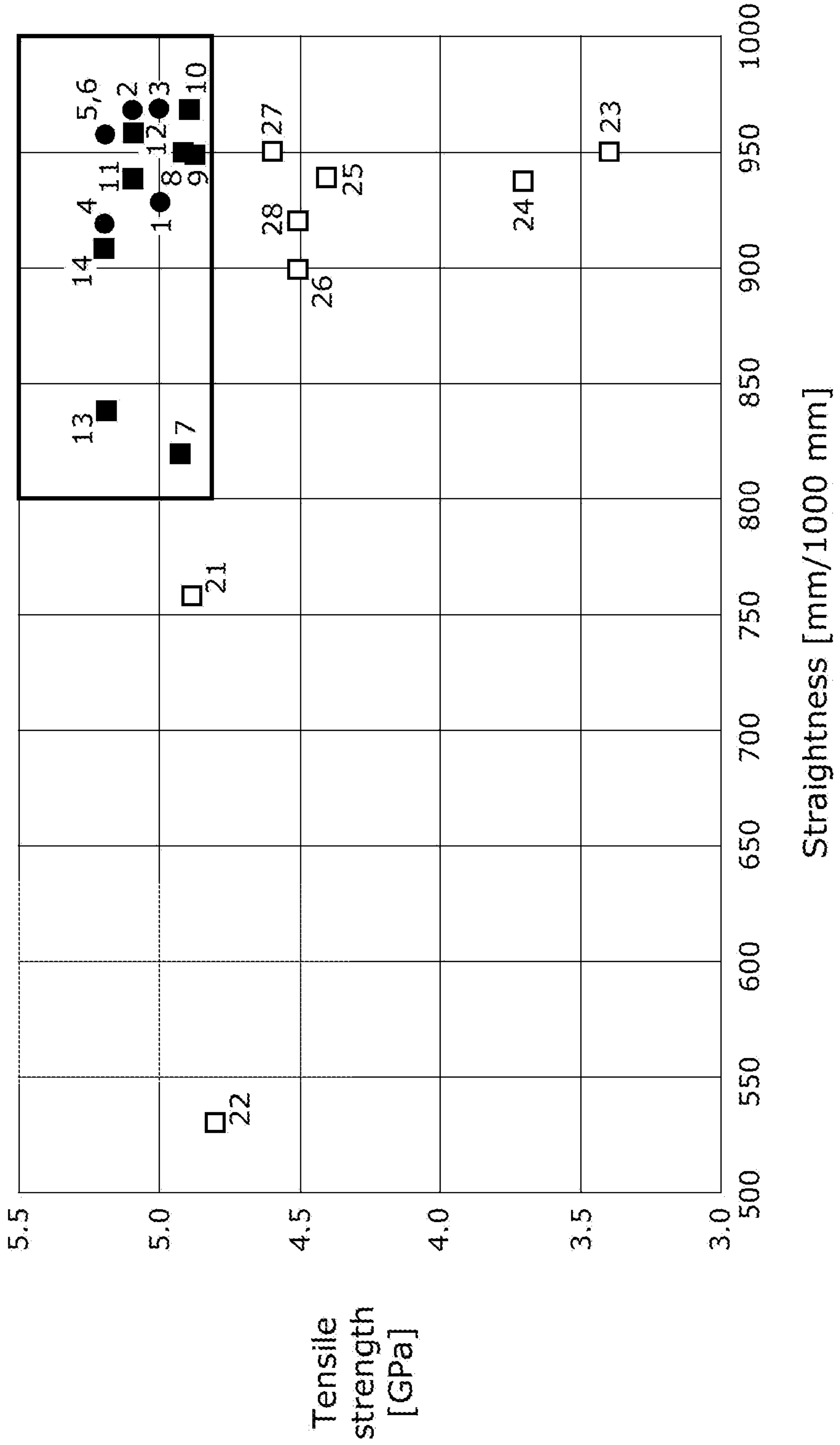
FIG. 3 is a diagram showing a relationship between the straightness and the tensile strength of the metal wire according to the embodiment.

FIG. 3 shows a relationship between straightness and tensile strength in each working example shown in Table 1 and each comparative example shown in Table 2. FIG. 3 is a diagram showing a relationship between the straightness and the tensile strength of metal wire 10 according to the present embodiment. In FIG. 3, straightness (natural hanging length per 1000 mm) of metal wire 10 is represented on the horizontal axis, and tensile strength of metal wire 10 is represented on the vertical axis.

Figure 4:
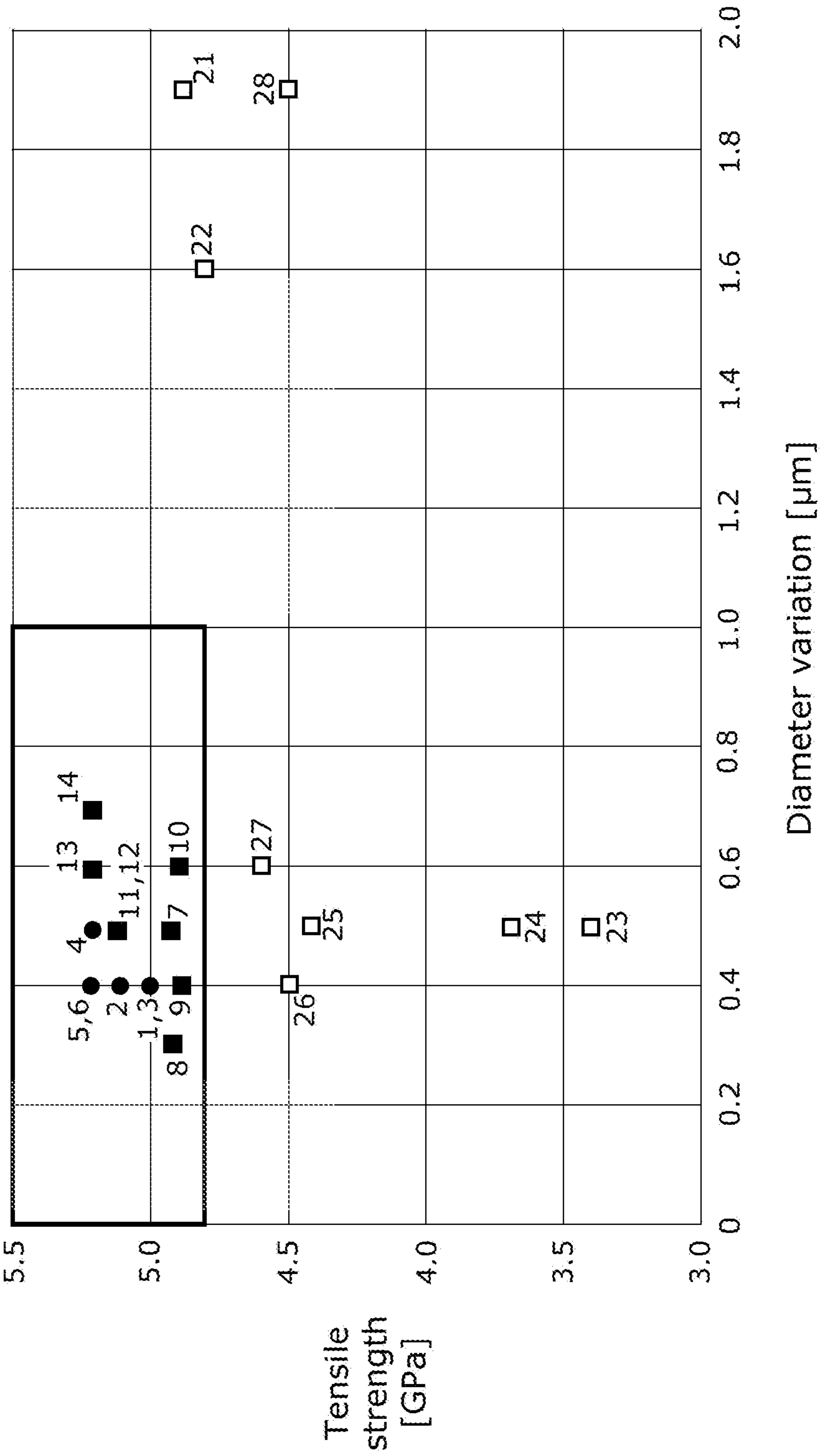
FIG. 4 is a diagram showing a relationship between the diameter variation and the tensile strength of the metal wire according to the embodiment.

FIG. 4 shows a relationship between the diameter variation and the tensile strength in each of the working examples shown in Table 1 and each of the comparative examples shown in Table 2. FIG. 4 is a diagram showing a relationship between the diameter variation and tensile strength of metal wire 10 according to the present embodiment. In FIG. 4, the diameter variation of metal wire 10 is represented on the horizontal axis, and the tensile strength of metal wire 10 is represented on the vertical axis. Note that in FIGS. 3 and 4, the number adjacent to a plotted point represents each of the numbers assigned to the working examples and comparative examples, namely, Working Examples 1 to 14 in Table 1 and Comparative Examples 21 to 28 in Table 2.

processing rate of the drawing at room temperature, and the temperature of the low-temperature hot drawing.

The metal wire in each of Comparative Examples 21 and 22 is a metal wire manufactured without the low-temperature hot drawing (S22) after the drawing at room temperature (S20) is performed. As shown in Table 2 and FIG. 3, although high tensile strength is obtained by the drawing at room temperature, the straightness is low. In addition, as shown in FIG. 4, the diameter variation is large and the straightness is low.

The metal wire in each of Comparative Examples 23 to 26 is a metal wire manufactured without either room temperature drawing (S20) or low-temperature hot drawing (S22). As shown in Table 2 and FIGS. 3 and 4, high tensile strength cannot be obtained when the drawing at room temperature is not performed. In order to increase the tensile strength, the drawing at room temperature is necessary, but in this case, straightness decreases as in Comparative Examples 21 and 22.

Note that the metal wire in each of Comparative Example 27 is a metal wire obtained by performing the drawing at room temperature (S20) and normal hot drawing at a temperature of from 500° C. to 600° C., instead of the low-temperature hot drawing (S22). As shown in Table 2 and FIG. 3, although high straightness is achieved, the tensile strength does not reach 4.8 GPa.

Accordingly, high tensile strength and high straightness cannot be both achieved when the low-temperature hot drawing is not performed. There is a trade-off relationship between the tensile strength and the straightness of a thin metal wire having a diameter of at most 13 μm, such as the metal wire according to the comparative examples. In other words, the straightness decreases when the tensile strength is increased, and the tensile strength decreases when the straightness is increased.

In contrast, as shown in Table 1 and FIG. 3, high tensile strength and high straightness are achieved in Working Examples 1 to 14. In addition, as shown in FIG. 4, high tensile strength and a small diameter variation, or high straightness is achieved. In other words, it is possible to obtain metal wire 10 having both high tensile strength and high straightness by performing low-temperature hot drawing, even when the diameter is at most 13 μm and thin. Metal wire 10 is a tungsten wire that does not contain rhenium, or a rhenium-tungsten alloy wire having a rhenium content of at most 10 wt %, and thus metal wire 10 is excellent in workability.

Note that the metal wire in each of Working Examples 1 to 6 is a rhenium-tungsten alloy wire containing 1 wt % of rhenium, and the metal wire in each of Working Examples 7 to 14 is a tungsten wire that does not contain rhenium. As can be seen from Table 1, when the tungsten wires with the same diameter and the same drawing conditions are compared, the tensile strength of the rhenium-tungsten alloy wire is slightly improved compared with the tensile strength of the tungsten wire. This is due to the solid solution strengthening mechanism. In addition, dispersion strengthening by precipitation at grain boundaries in an oxide state also contributes to the improvement of the tensile strength to some extent.

Therefore, a similar effect can be obtained if other metallic elements having different atomic radii are used instead of rhenium as elements that cause such a reinforcement mechanism. That is to say, when metal wire 10 includes a tungsten alloy, the metal included in the tungsten alloy does not have to be rhenium. In other words, the tungsten alloy may be an alloy of tungsten and at least one type of metal different from tungsten.

Metals different from tungsten are, for example, transition metals, and elements having atomic radii close to the atomic radius of rhenium, such as molybdenum (Mo), iridium (Ir), ruthenium (Ru), or osmium (Os). The content of each of these metals is, for example, but not limited to, at least 0.1 wt % and at most 10 wt %. For example, the content of the metal in the tungsten alloy may be less than 0.1 wt %, or may be greater than 1 wt %.

In addition, as can be seen by comparing Working Example 3 and Working Example 4, lowering the temperature of the low-temperature hot drawing can increase tensile strength while maintaining high straightness even when the diameter is the same. As can be seen by comparing Working Example 3 and Working Example 5, by increasing the processing rate of the drawing at room temperature, it is possible to increase tensile strength while maintaining high straightness even when the diameter is the same. Tungsten wire that does not contain rhenium has a similar relationship as can be seen by comparing Working Examples 9 to 14.

As can be seen by comparing Working Example 3 and Working Example 4, by increasing the temperature of the low-temperature hot drawing, it is possible to increase straightness while maintaining high tensile strength even when the diameter is the same. Tungsten wire that does not contain rhenium has a similar relationship as can be seen by comparing Working Examples 9 to 14.

Advantageous Effects, Etc.

As described above, metal wire 10 according to the present embodiment includes tungsten or a tungsten alloy. The metal wire has a diameter of at most 13 μm, a tensile strength of at least 4.8 GPa, and a natural hanging length per 1000 mm of at least 800 mm. Moreover, for example, the metal wire has a diameter variation of at most 1.0 μm.

This makes it possible to achieve metal wire 10 having a small diameter and excellent tensile strength and straightness.

Note that the straight annealing process is generally known as a treatment to enhance straightness. In the straight annealing process, a metal wire is heated at a high temperature of approximately 1000° C. after the wire drawing process or electrolytic polishing. However, for example, when the straight annealing process is performed on the metal wire in Comparative Example 21, although the straightness is enhanced, the tensile strength is reduced. For example, the metal wire in Comparative Example 28 in Table 2 is a metal wire obtained by performing the straight annealing process on the metal wire in Comparative Example 21. As can be seen in comparison with Comparative Example 21, the straightness can be improved by performing the straight annealing process, but instead of that, the tensile strength is reduced to less than 4.8 GPa. In other words, the straight annealing process cannot achieve both high straightness and high tensile strength. In addition, in the straight annealing process, the diameter variation is almost unchanged. Therefore, the diameter variation cannot be reduced.

In contrast, metal wire 10 according to the present embodiment is a metal wire without the straight annealing process. It is possible to achieve both high straightness and high tensile strength by the low-temperature hot drawing without the straight annealing process.

Moreover, for example, the metal wire has a natural hanging length per 1000 mm of at least 900 mm.

This increases the straightness, and therefore metal wire 10 is more useful for, for example, weaving metal mesh 20.

For example, if a metal wire having a diameter variation of more than 1.0 μm is used for weaving, uneven weaving is likely to occur during weaving. For this reason, the metal mesh that has been woven unevenly may have variations in height. If this metal mesh is used for a screen mesh, problems such as reduced precision in screen printing may occur when the metal mesh is pressed by a squeegee.

In addition, when a metal wire having straightness of less than 800 mm is woven, the wire may be kinked and cause problems such as wire breakage during weaving. If secondary processing of a wire other than weaving, such as twisted wire processing, is performed using a metal wire having a straightness of less than 800 mm, wire breakage or other problems may occur.

On the other hand, metal mesh 20 according to the present embodiment includes metal wire 10 as warp or weft. Moreover, for example, metal mesh 20 is used as a mesh for screen printing.

As a result, since metal wire 10 having a small diameter and excellent tensile strength and straightness is used, metal mesh 20 can be easily manufactured. Since the diameter is small, it is possible to manufacture metal mesh 20 having a high aperture ratio.

In addition, for example, the metal wire may have a tungsten content of at least 90 wt %.

With this, for example, by lowering the content of other elements such as rhenium and increasing the tungsten content, metal wire 10 having excellent workability can be achieved.

Others

Although the metal wire and the metal mesh according to the present invention have been described above based on the above-described embodiment, the present invention is not limited to the above-described embodiment.

For example, in the above-described embodiment, an example in which metal mesh 20 is a screen mesh has been described, but the present invention is not limited to this example. Metal mesh 20 may also be used as a filter or protective clothing, for example. All threads of warp and weft of metal mesh 20 may be metal wire 10. Alternatively, at least a single thread of warp or weft may be metal wire 10, and the remaining threads of warp or weft may be other metal wire such as stainless wire.

In addition, for example, metal wire 10 may be used in applications other than wire rods used for weaving metal mesh 20. For example, metal wire 10 may be used as saw wires, medical needles, ropes, or strings.

Moreover, for example, the tungsten content of metal wire 10 may be less than 75 wt % or less than 70 wt %.

Moreover, for example, metal wire 10 may include tungsten doped with potassium (K). Doped potassium is present at the crystal grain boundaries of tungsten. Potassium (K) dispersed at grain boundaries inhibits grain coarsening during heating at a high temperature and during the heat drawing, but no grain coarsening occurs during the drawing at room temperature. Therefore, the amount of potassium (K) may be, for example, at most 0.010 wt %. However, the presence of potassium (K) at grain boundaries has an effect of slight increase in strength in the processes up to the drawing at room temperature. With such a potassium doped tungsten wire, a tungsten wire having higher tensile strength than general tensile strength of a piano wire can be achieved, as with the tungsten alloy wire. A similar effect can be achieved not only with the oxides of potassium but also with oxides of other substances, such as cerium or lanthanum.

A potassium doped tungsten wire can be manufactured by the same manufacturing method as the present embodiment by using potassium doped tungsten powder instead of tungsten powder.

Moreover, for example, the surface of metal wire 10 may be coated with an oxide film or a nitride film, or may be plated.

Additionally, embodiments arrived at by those skilled in the art making modifications to the above embodiment, as well as embodiments arrived at by combining structural components and functions described in the above embodiment without materially departing from the teachings of the present invention are intended to be included within the scope of the present invention.

The invention claimed is:

1. A metal wire comprising:
tungsten or a tungsten alloy, wherein
the metal wire has:
a diameter of at most 9 μm;
a tensile strength of at least 4.8 GPa; and
a natural hanging length per 1000 mm of at least 800 mm.

2. The metal wire according to claim 1, wherein
the metal wire has a diameter variation of at most 1.0 μm.

3. The metal wire according to claim 1, wherein
the metal wire has a natural hanging length per 1000 mm of at least 900 mm.

4. The metal wire according to claim 1, wherein
the metal wire has a tungsten content of at least 90 wt %.

5. A metal mesh comprising the metal wire according to claim 1 as warp or weft.

6. The metal mesh according to claim 5, wherein
the metal mesh is used as a mesh for screen printing.

7. A metal wire comprising:
tungsten or a tungsten alloy, wherein
the metal wire has:
a diameter of at most 9 μm;
a tensile strength of at least 4.8 GPa; and
a diameter variation of at most 1.0 μm.

8. The metal wire according to claim 7, wherein
the metal wire has a natural hanging length per 1000 mm of at least 900 mm.

9. The metal wire according to claim 7, wherein
the metal wire has a tungsten content of at least 90 wt %.

10. A metal mesh comprising the metal wire according to claim 7 as warp or weft.

11. The metal mesh according to claim 10, wherein
the metal mesh is used as a mesh for screen printing.

* * * * *